No. 772,651. PATENTED OCT. 18, 1904.
S. T. FELMLEE.
VEHICLE OR OTHER WHEEL.
APPLICATION FILED MAR. 10, 1903.
NO MODEL.
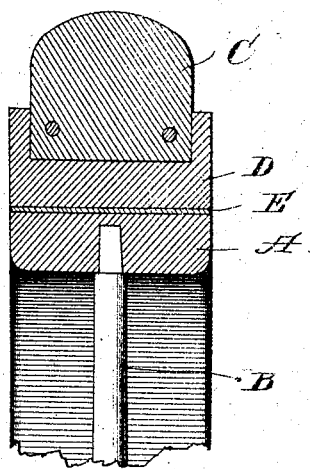
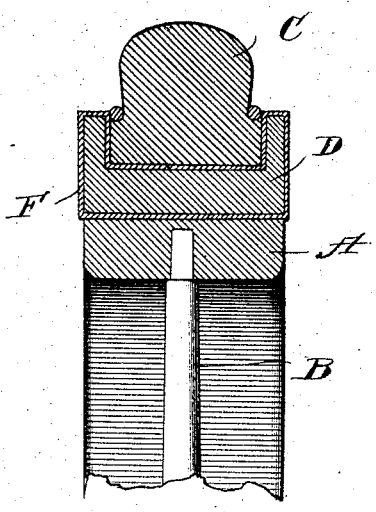

No. 772,651. Patented October 18, 1904.

UNITED STATES PATENT OFFICE.

SAMUEL T. FELMLEE, OF CHICAGO, ILLINOIS, ASSIGNOR OF THREE-EIGHTHS TO FRANK H. WOOD, OF CHICAGO, ILLINOIS.

VEHICLE OR OTHER WHEEL.

SPECIFICATION forming part of Letters Patent No. 772,651, dated October 18, 1904.

Application filed March 10, 1903. Serial No. 147,199. (No model.)

*To all whom it may concern:*

Be it known that I, SAMUEL T. FELMLEE, a citizen of the United States, residing at Chicago, in the county of Cook and State of Illinois, have invented a new and useful Vehicle or other Wheel, of which the following is a specification.

This invention relates to vehicle or other wheels.

The object of the invention is to provide means for preventing corrosion occurring between metal-rimmed wheels and the wheel-fellies.

A further object of the invention is to provide means for avoiding the occurrence of corrosion between the tires and the metal rims of metal-rimmed wheels.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings and to the various views appearing thereon, Figure 1 is a view in transverse section through a metal-rimmed wheel, its tire, and fellies and showing the application thereto of an arrangement embodying the principles of my invention. Fig. 2 is a similar view showing a modified arrangement embodying the principles of my invention and included within its spirit and scope.

In the drawings, reference-sign A designates the wheel-felly; B, the spoke; C, the tire; and D, the rim. These parts may be of the usual or any well-known or convenient construction, arrangement, and materials.

I have found in the continued use of metal-rimmed wheels, especially where joints occur between the parts—as, for instance, the joint between the rim and the felly—moisture gains access to the bearing-surfaces of the parts, thereby resulting in a corrosion of the metal and the formation of rust flakes or a layer of rust between the contacting surfaces of the parts. Where the wheel is provided with a steel tire, this layer of rust or oxidized material gradually becomes ground to powder and in the course of time sifts out from between such surfaces, thereby resulting in the parts becoming loosened and rattling, if not eventually falling apart. In the case of rubber-tired wheels, however, on account of the cushion afforded by the rubber tires this layer of rust or oxidized material does not become ground to powder, and hence remains between the bearing-surfaces of the parts, accumulating therein, and hence causing the parts to bind tighter and tighter as the accumulation progresses. This is objectionable, for the reason that any increase in the binding effect of the tire or of the rim upon the felly increases the dish of the wheel unduly and eventually, as the process of corrosion continues, rendering the wheel useless on account of its undue or increased dish.

It is among the special purposes of my present invention to avoid the objections noted, and I accomplish my object by interposing between the bearing-surfaces of the wheel parts a non-oxidizable or non-corrosive material—such, for instance, as copper or brass—though I do not desire to be limited or restricted to the character of the interposed material, as other materials may equally well answer the same purpose.

The interposed non-oxidizable non-corrosive material may be applied in the form of a band (indicated at E) to the surface of the felly against which the rim or journal D bears, where the felly is of metal, or to the inner surface of the metal rim or journal D, which bears against the felly, where the felly is of wood. This protecting non-corrosive covering or coating is applied to the felly or to the rim, as the case may be, in a manner to effect an intimate association of the non-corrosive non-oxidizable material of the part to which it is applied. This may be effected by electrodeposition or by immersing the part to which the same is to be applied in a fluid bath of the material to be employed for this purpose.

In Fig. 2 I have shown my invention as above described applied in the form of a band between the bearing-surfaces of the felly and the rim. It may sometimes be desirable to also apply the protecting sheeting or coating to the seat in which the tire is placed within the rim. For this reason and for the further reason of convenience the protecting-coating, whether applied by electrodeposition or by bath, as above explained, may be applied to the entire surface of the rim, as indicated at F in Fig. 1.

I have shown my invention as applied to a rubber-tired wheel wherein the tire is held or retained within the metal rim D by binding-wires in the usual or any ordinary manner; but I desire to be understood that my invention is not to be limited to rubber-tired wheels nor to wheels employing channel-rims, as it may be applied with equal facility to any ordinary form or construction of wheel employing metal parts which are brought into contact with each other.

Having now set forth the object and nature of my invention and various constructions embodying the principles thereof, what I claim as new and useful and of my own invention, and desire to secure by Letters Patent, is—

1. A wheel, comprising parts arranged to be brought into bearing contact with each other, one of such parts being metallic and the other part substantially rigid and unyielding, and a non-oxidizable or non-corrosive lining or coating deposited on and in integral association with the surface of the metallic part which forms the bearing-surface for the other part, to prevent corrosion and consequent rust formation between such surfaces, as and for the purpose set forth.

2. A wheel, comprising a felly and a metallic rim, and a non-corrosive or non-oxidizable coating interposed between the surface of said metallic rim against which the surface of the felly bears, said coating being applied in integral association with said rim to prevent corrosion and consequent rust formation between such bearing-surfaces, as and for the purpose set forth.

3. A wheel, comprising a felly and a metallic rim, and a non-corrosive or non-oxidizable coating applied to the surface of and in integral association with the metallic rim to form the bearing-surface thereof upon the peripheral surface of the felly to prevent corrosion and consequent rust formation between such bearing-surfaces, as and for the purpose set forth.

4. A wheel, comprising a felly, and a tire adapted to be applied thereto, one of these parts being metallic and the other substantially rigid or unyielding, and a non-corrosive coating or lining applied in integral association with the metal of the surface of said metallic part which bears the corresponding surface of the other part, to prevent corrosion and consequent rust formation between such bearing-surfaces, as and for the purpose set forth.

5. In a wheel, a felly, a metallic rim adapted to be applied thereto, said rim formed to receive a tire, and a coating of an electrodeposited non-corrosive or non-oxidizable material upon the surface of the rim which contacts with the felly, to prevent corrosion and consequent rust formation between such surfaces, as and for the purpose set forth.

In witness whereof I have hereunto set my hand, this 7th day of March, 1903, in the presence of the subscribing witnesses.

SAMUEL T. FELMLEE.

Witnesses:
C. H. SEEM,
S. E. DARBY.